United States Patent
Takehara et al.

(10) Patent No.: US 11,009,860 B2
(45) Date of Patent: May 18, 2021

(54) PREPARATION SCHEDULE CREATING METHOD AND PREPARATION SCHEDULE CREATING APPARATUS

(71) Applicant: Panasonic Intellectual Property Management Co., Ltd., Osaka (JP)

(72) Inventors: Hirokazu Takehara, Fukuoka (JP); Hiroki Sagara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 16/351,855

(22) Filed: Mar. 13, 2019

(65) Prior Publication Data

US 2019/0302747 A1 Oct. 3, 2019

(30) Foreign Application Priority Data

Mar. 30, 2018 (JP) .............................. JP2018-067338

(51) Int. Cl.
*G05B 19/418* (2006.01)

(52) U.S. Cl.
CPC .............. *G05B 19/41865* (2013.01); *G05B 2219/34418* (2013.01); *G05B 2219/45026* (2013.01)

(58) Field of Classification Search
CPC .... G05B 19/41865; G05B 2219/45026; G05B 2219/34418; G05B 2219/45029; G05B 2219/32263

See application file for complete search history.

(56) References Cited

U.S. PATENT DOCUMENTS

| | | | |
|---|---|---|---|
| 2014/0121826 A1* | 5/2014 | Kreitmeier | ................ B07C 3/00 700/223 |
| 2014/0235068 A1* | 8/2014 | Ashihara | ........... H01L 21/02164 438/771 |

(Continued)

FOREIGN PATENT DOCUMENTS

| | | | |
|---|---|---|---|
| JP | 2010-244506 | 10/2010 | |
| JP | 2012093865 A * | 5/2012 | |
| WO | WO-2008107959 A1 * | 9/2008 | ......... G01R 31/2893 |

*Primary Examiner* — Thomas C Lee
*Assistant Examiner* — Michael Tang
(74) *Attorney, Agent, or Firm* — Pearne & Gordon LLP

(57) ABSTRACT

A preparation schedule creating method includes: an information acquiring step of acquiring production schedule information including a production sequence, a commenceable time point, and a production deadline time point, member information related to the members, arrangement means information related to a state of arrangement means attached to production equipment and a state of equipment detached arrangement means detached from the production equipment, work quantity information related to a work quantity of arrangement work of arranging members on the arrangement means, worker information related to the number of workers that performs the arrangement work; a usable arrangement means selecting step of selecting a usable arrangement means based on the production schedule information and the arrangement means information; and a preparation work schedule determining step of determining the selected usable arrangement means as the usable arrangement means for one model in the preparation work schedule.

16 Claims, 12 Drawing Sheets

(56) References Cited

U.S. PATENT DOCUMENTS

| | | | |
|---|---|---|---|
| 2014/0330605 A1* | 11/2014 | Connolly | G06Q 10/063116 |
| | | | 705/7.16 |
| 2015/0173205 A1* | 6/2015 | Maenishi | H05K 13/085 |
| | | | 29/832 |
| 2018/0103116 A1* | 4/2018 | Raghunathan | H04L 67/22 |
| 2019/0056701 A1* | 2/2019 | Ikeda | G06Q 10/063 |
| 2019/0310610 A1* | 10/2019 | Ohashi | H05K 13/085 |
| 2020/0019655 A1* | 1/2020 | Ikeda | H05K 13/085 |
| 2020/0060053 A1* | 2/2020 | Shimizu | G05B 19/41865 |

* cited by examiner

| LOT NUMBER | MODEL NUMBER | NUMBER OF MEMBERS | DETACHMENT WORK TIME | ATTACHMENT WORK TIME | NUMBER OF PRODUCTION |
|---|---|---|---|---|---|
| A | X1 | 95 | 0:40 | 1:19 | 250 |
| B | X2 | 110 | 0:47 | 1:34 | 300 |
| C | X3 | 95 | 0:40 | 1:20 | 380 |
| D | X4 | 98 | 1:44 | 3:28 | 600 |
| E | X5 | 114 | 0:28 | 0:56 | 350 |
| F | X6 | 101 | 1:22 | 2:44 | 300 |
| G | X2 | 110 | 0:47 | 1:34 | 350 |
| H | X7 | 115 | 1:46 | 3:32 | 350 |

27b (PRODUCTION TIME POINT T1)

| CARRIAGE GROUP NUMBER | NUMBER OF USING CARRIAGES | CARRIAGE LOCATION | CARRIAGE SITUATION |
|---|---|---|---|
| C1 | 9 | L1 | X1 |
| C2 | 9 | L2 | X2 |
| C3 | 9 | PREPARATION AREA | – |
| C4 | 9 | PREPARATION AREA | X9 |

27b (PRODUCTION TIME POINT T2)

| CARRIAGE GROUP NUMBER | NUMBER OF USING CARRIAGES | CARRIAGE LOCATION | CARRIAGE SITUATION |
|---|---|---|---|
| C1 | 9 | PREPARATION AREA | X5 |
| C2 | 9 | IN STORAGE | X2 |
| C3 | 9 | L1 | X3 |
| C4 | 9 | L2 | X4 |
| ↑ | ↑ | ↑ | ↑ |
| 51 | 52 | 53 | 54 |

PREPARATION SCHEDULE CREATING METHOD AND PREPARATION SCHEDULE CREATING APPARATUS

BACKGROUND

1. Technical Field

The present disclosure relates to a preparation schedule creating method and a preparation schedule creating apparatus for creating a schedule for arranging a member on arrangement means that is attached to production equipment that produces a product.

2. Description of the Related Art

A plurality of models of products are produced on a production line for producing a product such as a mounting board with an electronic component mounted on the board. When a model of a product to be produced is changed, set-up changing of changing a member that is used for producing a product in the production line is performed. The set-up changing includes an external set-up that is performed in a place other than the production line in parallel with the production of the product, in addition to an internal set-up that is performed in the production line. When a production schedule for producing a plurality of models of products is created, a schedule in which a product can be produced within a delivery date is created, also with consideration for a preparation schedule of set-up changing or the like (for example, Japanese Patent Unexamined Publication No. 2010-244506).

In a production schedule creating apparatus disclosed in Japanese Patent Unexamined Publication No. 2010-244506, a production schedule is created such that a furnace washing process (set-up changing) of diluting a residue is performed in a case where the residue of a previously manufactured alloy influences a composition of an alloy to be manufactured next during manufacturing of alloys (products) having different compositions from each other in a melting furnace (production equipment) in sequence.

SUMMARY

According to the present disclosure, there is provided a preparation schedule creating method used in a preparation schedule creating apparatus that creates a preparation work schedule for arranging members corresponding to a plurality of models on arrangement means which is attached to production equipment that produces the plurality of models of products so as to arrange the members that are used for production of the products, the method including: an information acquiring step of acquiring production schedule information including a production sequence for producing the plurality of models of products, a commenceable time point when production of the plurality of models of products is commenceable, and a production deadline time point, member information related to the members, arrangement means information related to a state of the arrangement means attached to the production equipment and a state of equipment detached arrangement means detached from the production equipment, work quantity information related to a work quantity of arrangement work of arranging members on the arrangement means, worker information related to the number of workers that performs the arrangement work; a usable arrangement means selecting step of selecting a usable arrangement means which is the arrangement means that is used in production of one model, based on the production schedule information and the arrangement means information; and a preparation work schedule determining step of determining the selected usable arrangement means as the usable arrangement means for the one model in the preparation work schedule.

According to the present disclosure, there is provided a preparation schedule creating apparatus that creates a preparation work schedule for arranging members corresponding to a plurality of models on arrangement means which is attached to production equipment that produces the plurality of models of products so as to arrange the members that are used for production of the products, the apparatus including: an information acquirer that acquires production schedule information including a production sequence for producing the plurality of models of products, a commenceable time point when production of the plurality of models of products is commenceable, and a production deadline time point, member information related to the members, arrangement means information related to a state of the arrangement means attached to the production equipment and a state of equipment detached arrangement means detached from the production equipment, work quantity information related to a work quantity of arrangement work of arranging members on the arrangement means, worker information related to the number of workers that performs the arrangement work; a usable arrangement means selector that selects a usable arrangement means which is the arrangement means that is used in production of one model, based on the production schedule information and the arrangement means information; and a preparation work schedule determiner that determines the selected usable arrangement means as the usable arrangement means for the one model in the preparation work schedule.

In the present disclosure, it is possible to create an optimal schedule for arranging the members on the arrangement means.

BRIEF DESCRIPTION OF THE DRAWINGS

FIG. 6 is a diagram of an example of lot information that is used in the managing computer (preparation schedule creating apparatus) of the exemplary embodiment of the present disclosure;

FIG. 7 is a diagram of an example of carriage information that is used in the managing computer (preparation schedule creating apparatus) of the exemplary embodiment of the present disclosure;

FIG. 12 is a diagram of an example of carriage information in which a storage carriage is set, the carriage information being used in the managing computer (preparation schedule creating apparatus) of the exemplary embodiment of the present disclosure;

DETAILED DESCRIPTION

In a production schedule creating apparatus disclosed in Japanese Patent Unexamined Publication No. 2010-244506, a production schedule is created in a condition that production of a product and set-up changing are not temporally overlapped. However, the production schedule creating apparatus has many limiting conditions that the production of the product can be performed in parallel with the set-up changing or work cannot be started when production of a product is not completed. Problems arise in that a long time is taken to create a preparation schedule for performing the set-up changing with consideration for the limiting conditions and it is difficult to create an optimal preparation schedule without a delay in the production schedule.

In this respect, an object of the present disclosure is to provide a preparation schedule creating method and a preparation schedule creating apparatus that can create an optimal schedule for arranging members on arrangement means.

Figure 3:
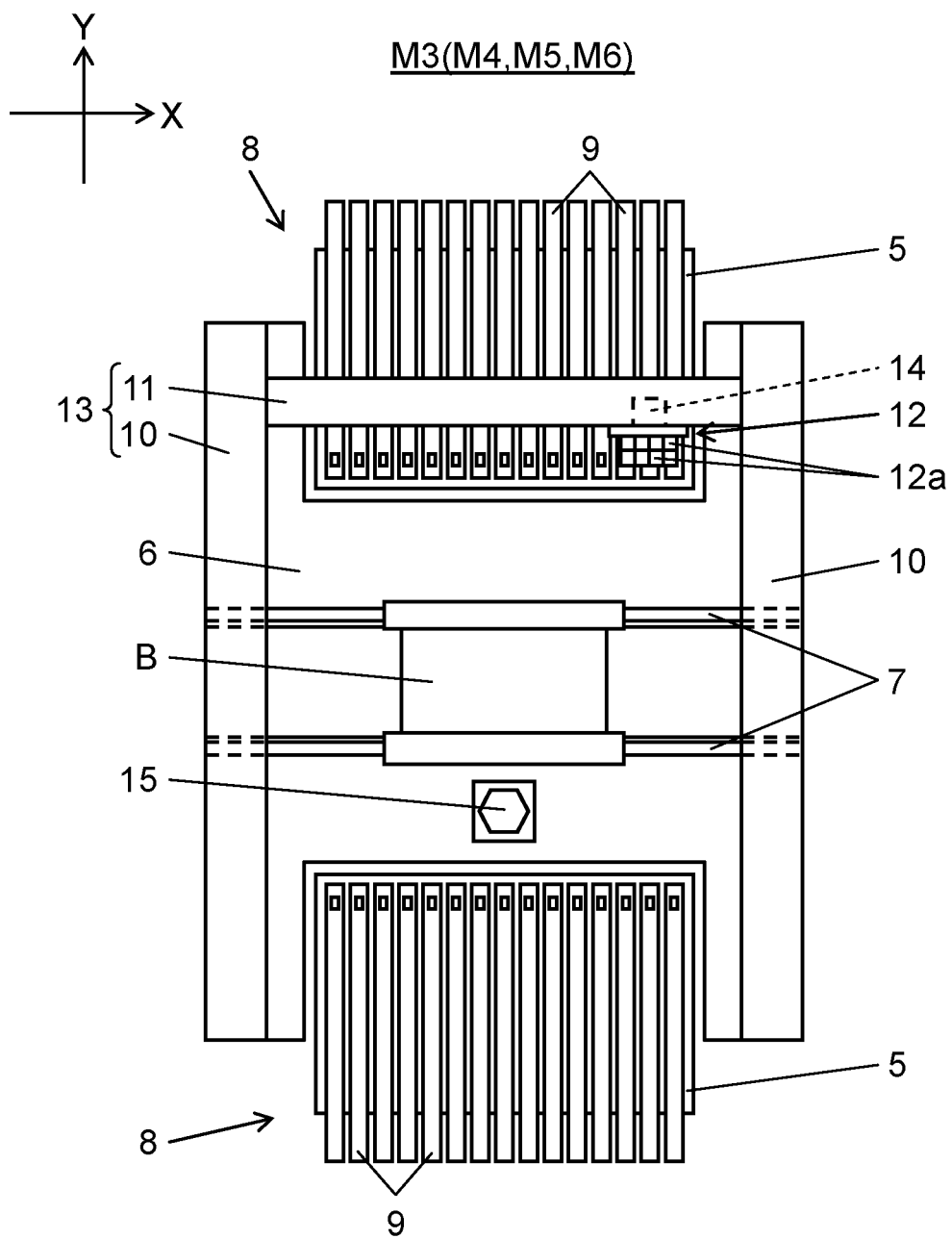
FIG. 3 is a plan view of a component mounter included in the component mounting system of the exemplary embodiment of the present disclosure.
Figure 4:
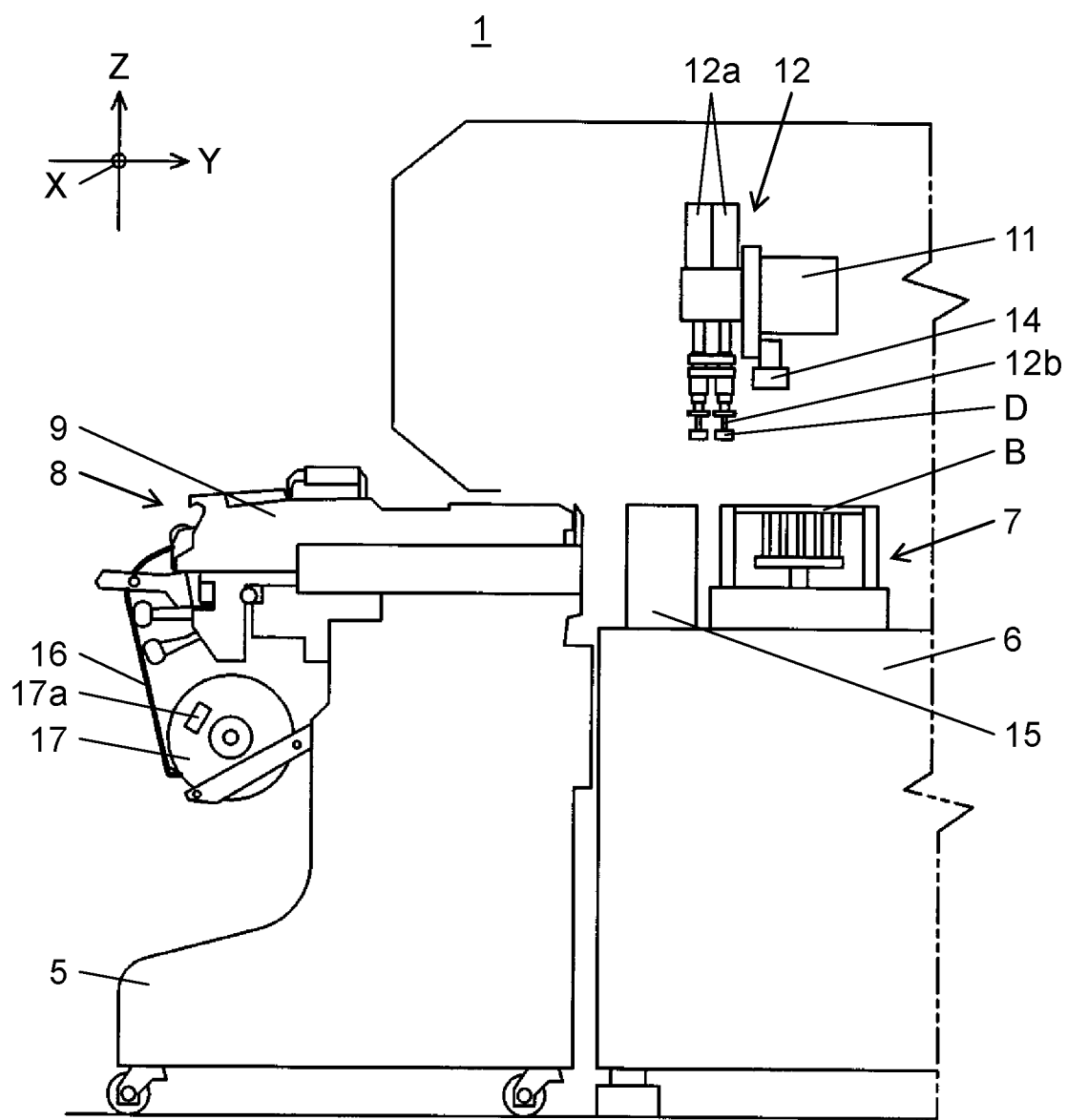
FIG. 4 is a partial sectional view of the component mounter included in the component mounting system of the exemplary embodiment of the present disclosure.

Hereinafter, exemplary embodiments of the present disclosure will be described in detail with reference to the drawings. A configuration, a shape, or the like to be described below, is an example for providing the description and can be appropriately modified according to specifications of a component mounting system, a component mounting line, a component mounter, and a carriage. Hereinafter, the same reference signs are assigned to corresponding elements in all of the drawings, and thus repeated description thereof is omitted. In FIG. 3 and a part of the following description, an X direction (right-left direction in FIG. 3) of a board transporting direction and a Y direction (vertical direction in FIG. 3) orthogonal to the board transporting direction are illustrated as two axial directions which are orthogonal to each other in a horizontal plane. In FIG. 4, a Z direction (vertical direction in FIG. 4) is illustrated as a height direction orthogonal to the horizontal plane. The Z direction is the vertical direction or an orthogonal direction in a case where the component mounter is installed on a horizontal plane.

First, a configuration of component mounting system 1 is described with reference to FIG. 1. Component mounting system 1 has a configuration in which three component mounting lines L1 to L3 arranged on floor F are connected to each other via communication network 2 and managing computer 3 manages the three component mounting lines. Component mounting lines L1 to L3 are arranged in production area Ap provided on floor F. Component mounting lines L1 to L3 are configured of a plurality of connected pieces of production equipment including the component mounter as will be described below and have a function of producing a mounting board having a configuration in which an electronic component is mounted on a board. There is no need to provide three component mounting lines L1 to L3 in component mounting system 1, and two and four or more component mounting lines may be provided.

Arrangement work supporting device 4 is disposed in preparation area As different from production area Ap provided on floor F. Arrangement work supporting device 4 is connected to managing computer 3 via communication network 2. Carriage 5 for replacement, which is a target of arrangement work to be described below, is connected to arrangement work supporting device 4. A plurality of carriages 5 having various statuses such as before, while, or after the arrangement work is performed are stored in preparation area As.

Figure 1:
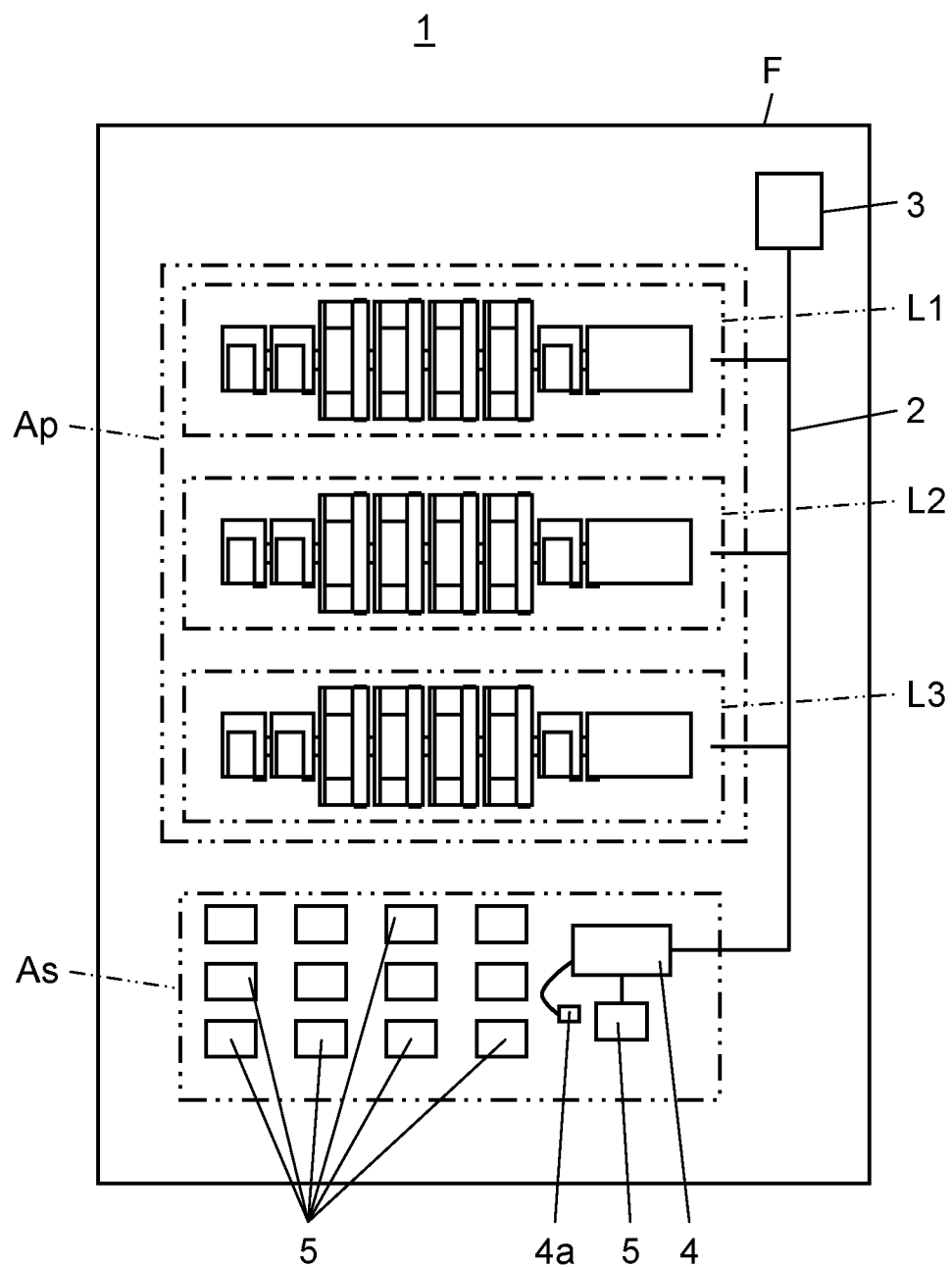
FIG. 1 is a diagram for illustrating a configuration of a component mounting system of an exemplary embodiment of the present disclosure.

In FIG. 1, on carriage 5 connected to arrangement work supporting device 4, a worker performs the arrangement work of installing a plurality of tape feeders 9 (refer to FIG. 3) or the like, which supply an electronic component, on carriage 5, in accordance with a work instruction corresponding to a model of mounting board that is produced on component mounting lines L1 to L3 from the carriage. When tape feeder 9 is installed on carriage 5 connected to arrangement work supporting device 4, electric power is supplied to tape feeder 9 by arrangement work supporting device 4 via carriage 5 such that a feeder controller (not illustrated) that is internally provided in tape feeder 9 comes into a state of being capable of communicating with managing computer 3.

The worker includes a working device that performs the arrangement work of installing the plurality of tape feeders 9 or the like, which supply an electronic component, on carriage 5, in accordance with the work instruction corresponding to the model of mounting board to be produced, in addition to a person who performs work. The working device may be configured to complete the arrangement work inside the device or include an articulated robot that performs the arrangement work in a procedure close to a work procedure performed by a person outside the device. In addition, the number of workers may include only one or both the persons and the working devices.

Consequently, in managing computer 3, it is possible to acquire a state of arrangement work such as an installation state of tape feeder 9 to carriage 5 or a supply state of carrier tape 16 (refer to FIG. 4), in which the electronic component to be installed in tape feeder 9 is held, to tape feeder 9. In the arrangement work, carrier tape 16 is attached to tape feeder 9. Code reader 4a included in arrangement work supporting device 4 performs work of reading and checking information of barcode 17a (refer to FIG. 4) or the like on reel 17 that is housed in a state in which carrier tape 16 is wound. There is no need to provide one arrangement work supporting device 4 that is disposed in preparation area As, and two or more arrangement work supporting devices may be provided.

As described above, on carriages 5 in preparation area As, which include carriage 5 connected to arrangement work supporting device 4, it is possible to perform the arrangement work in parallel with the production of the mounting board in component mounting lines L1 to L3. When a model of mounting board to be produced in component mounting lines L1 to L3 is changed, the worker moves carriage 5, on which tape feeder 9 is installed in preparation area As, to component mounting lines L1 to L3 and performs replacement work of replacing carriage 5 installed in the component mounter.

Figure 2:
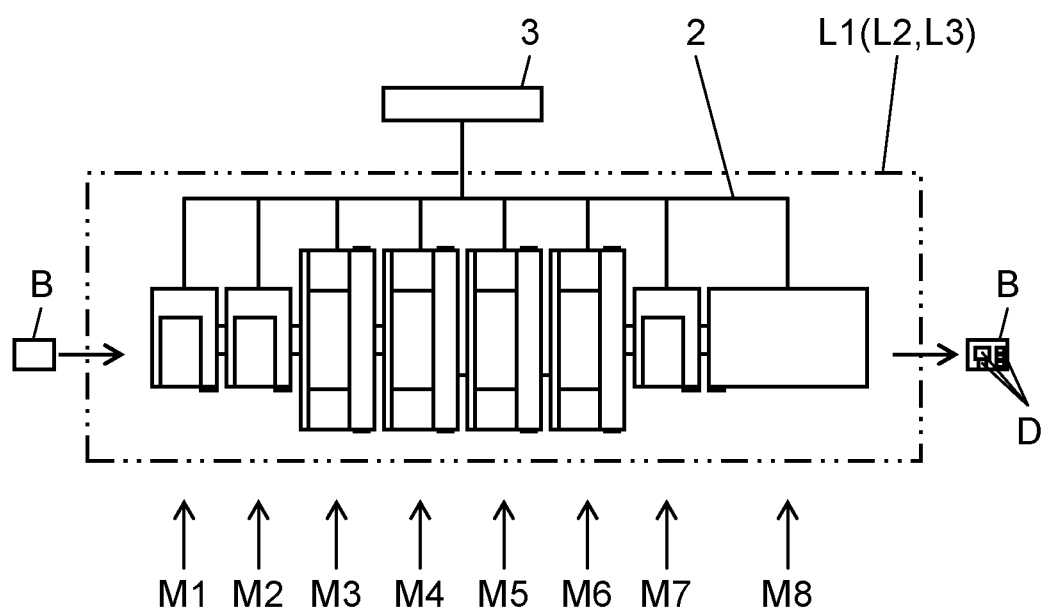
FIG. 2 is a diagram for illustrating a configuration of a component mounting line included in the component mounting system of the exemplary embodiment of the present disclosure.

Next, a detailed configuration of component mounting lines L1 to L3 will be described with reference to FIG. 2. Component mounting lines L1 to L3 have the same configuration as each other and, hereinafter, component mounting line L1 will be described. Component mounting line L1 has a configuration in which production equipment such as solder printing device M1, print inspecting device M2, component mounters M3 to M6, mounting inspecting device M7, and reflow device M8, are connected to each other in series from an upstream side (left side on the paper surface) to a downstream side (right side on the paper surface) in a board transporting direction.

Component mounting line L1 is a production equipment group that is connected via communication network 2, and the pieces of production equipment may not be physically connected to each other.

Solder printing device M1, print inspecting device M2, component mounters M3 to M6, mounting inspecting device M7, and reflow device M8 are connected to managing computer 3 via communication network 2. Solder printing device M1 performs a solder printing job in which printing is performed with solder by a solder printing-job operator via a mask onto board B brought in from the upstream side. Print inspecting device M2 performs print inspecting work of inspecting a state of solder printed on board B by print inspecting work operator including a solder inspecting camera. A solder applicator that applies the solder on board B may be provided along with solder printing device M1 or instead of solder printing device M1. In addition, component mounting line L1 may not include print inspecting device M2.

Component mounters M3 to M6 perform component mounting work of mounting electronic component D on board B by a component mounting work operator. Component mounting line L1 is not limited to a configuration in which four component mounters M3 to M6 are provided, and one to three or five or more component mounters M3 to M6 may be provided. Mounting inspecting device M7 performs mounting inspecting work of inspecting a state of electronic component D mounted on board B by mounting inspecting work operator including a component inspecting camera. Reflow device M8 heats board B brought in the device by a board heater, causes the solder on board B to harden, and performs board heating work of bonding an electrode portion of board B to electronic component D. Component mounting line L1 may not include mounting inspecting device M7.

Next, a configuration of component mounters M3 to M6 will be described with reference to FIGS. 3 and 4. Component mounters M3 to M6 have the same configuration as each other and, here, component mounter M3 will be described. Component mounter M3 has a function of mounting electronic component D on board B. In FIG. 3, board transport mechanism 7 is disposed in an X direction at the center of base stand 6. Board transport mechanism 7 transports board B brought in from the upstream side in the X direction and positions and holds the board at a mounting working position by a mounting head to be described below. In addition, board transport mechanism 7 brings out board B, on which the component mounting work is ended, to the downstream side. Component suppliers 8 are disposed on both sides of board transport mechanism 7.

Carriage 5, on which the plurality of tape feeders 9 are installed side by side in the X direction, is attached to each of component supplier 8. Tape feeder 9 performs pitch feeding of the carrier tape provided with a pocket for housing electronic component D in a direction (tape feeding direction) from outside of component supplier 8 toward board transport mechanism 7, thereby supplying electronic component D to a component picking-up position at which the mounting head picks up electronic component D.

In FIG. 3, Y-axis tables 10 including a linear drive mechanism are disposed at both end portions of a top surface of base stand 6 in the X direction. Similarly, beam 11 including a linear mechanism is bonded to Y-axis table 10 so as to move freely in the Y direction. Mounting head 12 is installed on the beam 11 so as to move freely in the X-axis direction. Mounting head 12 has a plurality of (here, eight) nozzle units 12a. In FIG. 4, each of the nozzle units 12a has a lower end portion provided with suction nozzle 12b that performs vacuum suction of electronic component D so as to hold the electronic component.

In FIG. 3, mounting head moving mechanism 13 is configured to include Y-axis table 10 and beam 11 and moves mounting head 12 in a horizontal direction (X direction and Y direction). Mounting head moving mechanism 13 and mounting head 12 perform the component mounting work in which suction nozzle 12b suctions and picks up electronic component D from the component picking-up position of tape feeder 9 installed in component supplier 8 and conveys and mounts the electronic component at a mounting position of board B held by board transport mechanism 7.

In FIGS. 3 and 4, head camera 14 that is positioned on an undersurface side of beam 11 so as to integrally move along with mounting head 12 is installed on beam 11. Mounting head 12 moves, and thereby head camera 14 moves above board B positioned at the mounting working position of board transport mechanism 7 so as to image a board mark (not illustrated) provided on board B. In this manner, a position of board B is recognized.

Component recognition camera 15 is disposed between component supplier 8 and board transport mechanism 7. When mounting head 12 that has taken out electronic component D from component supplier 8 moves above the component recognition camera, component recognition camera 15 images electronic component D held by suction nozzle 12b so as to recognize a holding position or the like. In the component mounting work of electronic component D to board B by mounting head 12, the mounting position is corrected with consideration for a recognition result of board B by head camera 14 and a recognition result of electronic component D by component recognition camera 15.

In FIG. 4, reel 17, around which carrier tape 16 housing electronic component D is wound, is held on a front side of carriage 5. Tape feeder 9 transports carrier tape 16, which is housed in reel 17, in a tape feeding direction, so as to supply electronic component D to a component picking-up position by mounting head 12.

As described above, component mounters M3 to M6 are the production equipment that produces mounting board on which electronic component D as a product is mounted, and component mounting lines L1 to L3 including component mounters M3 to M6 are production lines for producing the mounting board. Carriage 5 is arrangement means on which members (tape feeder 9 and reel 17) which are used in the production of the product (mounting board) are arranged. Carriage 5 is attached to component mounters M3 to M6 configuring component mounting lines L1 to L3 such that the members are arranged.

Next, a configuration of managing computer 3 will be described with reference to FIG. 5. Managing computer 3 includes inputter 29 and display 30, in addition to processor 20, production schedule storage 26, preparation work schedule storage 27, and worker information storage 28 which are storage devices. Processor 20 is a data processing device such as a CPU and includes information acquirer 21, usable arrangement means selector 22, preparation work schedule determiner 23, delay determination processor 24, and storage setter 25 as internal processors. Managing computer 3 does not need to be configured of one computer and may be configured of a plurality of devices. For example, the entire or a part of storage device may include a cloud via a server.

Inputter 29 is an input device such as a keyboard, a touch panel, or a mouse and is used in an operating command, during data input, or the like. Display 30 is a display device such as a liquid crystal panel and displays various items of information such as an operating screen for an operation by inputter 29 or a warning notifying screen, as well as various items of data stored in the storages.

Figure 5:
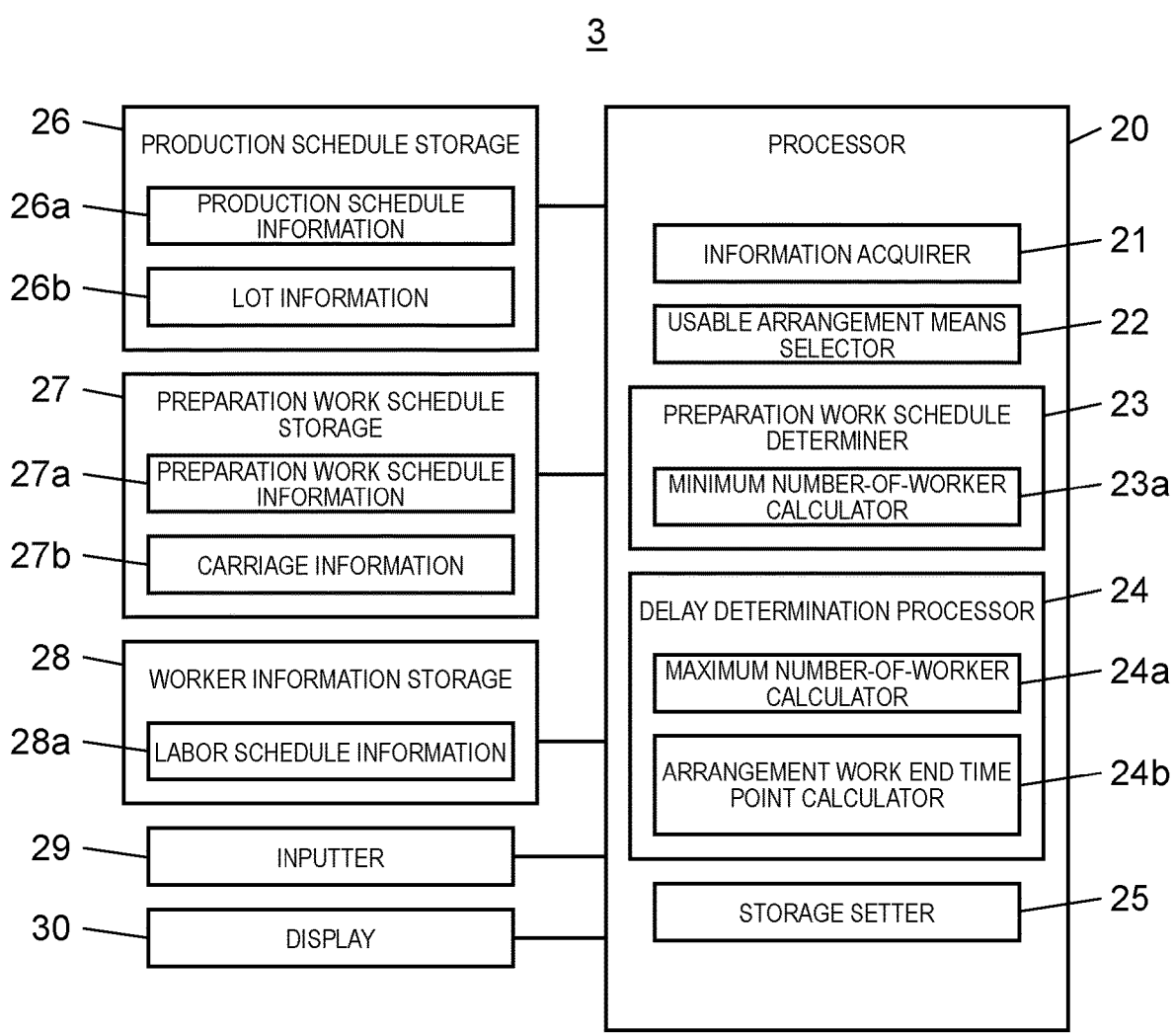
FIG. 5 is a block diagram illustrating a configuration of a managing computer (preparation schedule creating apparatus) of the exemplary embodiment of the present disclosure.

In FIG. 5, production schedule storage 26 stores production schedule information 26a, lot information 26b, or the like. In production schedule information 26a, a production schedule including a line number for identifying component mounting lines L1 to L3 that produce a mounting board, a start time point and an end time point of production, a commenceable time point when the production is commenceable and a production deadline time point, a production sequence of the mounting board, or the like is stored for each lot number for identifying a lot of the mounting board to be produced. In lot information 26b, a model number for identifying a model of the mounting board, the number of members (tape feeders 9 and reel 17) that are used in the production of the model, a work quantity of the arrangement work of arranging the members on carriage 5, the number of mounting boards to be produced, or the like is stored for each lot number for identifying the lot of the mounting board to be produced.

Here, an example of lot information 26b is described with reference to FIG. 6. Lot information 26b includes lot number 41, model number 42, number-of-members 43, detachment work time 44, attachment work time 45, and number-of-production 46. Lot number 41 is information for identifying a lot of the mounting board to be produced in component mounting lines L1 to L3. Model number 42 is information for identifying a model of the mounting board. Number-of-members 43 is the number of members that are used in production of the model. Detachment working time 44 is a total working time taken to detach the members from carriage 5 as the arrangement work performed by one worker. Attachment working time 45 is a total working time taken to attach the members corresponding to the model (lot) to carriage 5, as the arrangement work performed by one worker. Number-of-production 46 is the number of mounting boards to be produced of each lot. In this example, lot information 26b includes information for eight lots of lot A to lot H. In lot B and lot G, mounting boards of the same model X2 are produced. As described above, lot information 26b includes member information (number-of-members 43) related to the members which are used in the production of the model (lot) and work quantity information (detachment work time 44 and attachment work time 45) related to the work quantity of the arrangement work of arranging the members on the arrangement means (carriage 5).

In FIG. 5, preparation work schedule storage 27 stores preparation work schedule information 27a, carriage information 27b, or the like. In preparation work schedule information 27a, a preparation work schedule including the start time point and the end time point of the arrangement work of arranging the members (tape feeder 9 and reel 17) corresponding to a model on carriage 5 (arrangement means) is stored for each model of mounting board. In carriage information 27b, a carriage group number for identifying the plurality of carriages 5 which are simultaneously attached to component mounting lines L1 to L3 and used in the production of the mounting boards, the number of carriages 5 that configure a carriage group, a location of the carriage group, a situation of the carriage, or the like is stored.

Here, an example of carriage information 27b is described with reference to FIG. 7. Carriage information 27b includes carriage group number 51, number-of-using-carriages 52, carriage location 53, and carriage situation 54. Carriage group number 51 is information for identifying the carriage group. Number-of-using-carriages 52 is the number of carriages 5 that are used in the carriage group. Carriage location 53 is information for identifying a location of the carriage group. For example, "L1" and "L2" indicate that carriage groups C1 to C4 are located in component mounting line L1 and component mounting line L2, respectively. The "preparation area" indicates that carriage groups C1 to C4 are located in preparation area As.

"In storage" indicates that carriage groups C1 to C4 detached from component mounters M3 to M6 are storage carriages which are not used in other production but are stored to later production in a case where the carriage groups can be used in the production of the model (lot) to be produced later (refer to carriage group C2 in FIG. 12). Carriage situation 54 indicates whether or not the members are arranged on carriage groups C1 to C4. A carriage in use on which the members are arranged, a used carriage, a prepared carriage, and a storage carriage are stored by model number 42 in carriage situation 54, and an empty carriage on which the members are not arranged is represented by a blank cell (–) of carriage situation 54.

The carriages in use which are attached to component mounters M3 to M6 so as to be used in the production are stored by "L1" and "L2" in carriage location 53. The used carriages are carriage groups C1 to C4 which are detached from component mounters M3 to M6 and on which the members for the previous production are arranged, and the prepared carriages are carriage groups C1 to C4 on which arrangement of members for the next production is completed. As described above, carriage information 27b includes arrangement means information (carriage situation 54) related to a status of the arrangement means (carriage groups C1 to C4) attached to the production equipment (component mounters M3 to M6) and a status of arrangement means (equipment detached arrangement means) detached from the production equipment.

In FIG. 5, worker information storage 28 stores labor schedule information 28a or the like. Labor schedule information 28a includes worker information or the like related to the number of workers who perform various types of work including the arrangement work (number of workers) on floor F for each production time point.

In FIG. 5, processor 20 performs a preparation schedule creating process of creating a preparation work schedule in which the number of workers and a sequence of the arrangement work of arranging the members (tape feeder 9 and reel 17) on carriages 5 (carriage groups C1 to C4) are optimized, in a condition that the production schedule such as a production sequence of the model (lot) and the start time point and the end time point of the production is not changed. Information acquirer 21 acquires production schedule information 26a, lot information 26b (member information or work quantity information), carriage information 27b (arrangement means information), and labor schedule information 28a (worker information).

Storage setter 25 performs a storage setting process of setting arrangement means as a storage carriage (storage arrangement means), based on information (lot number 41 and model number 42) related to the production sequence included in production schedule information 26a and a production planned lot included in lot information 26b, in a case where the arrangement means (carriage groups C1 to C4) detached from the production equipment can be used in production of a model (lot) to be produced later. Storage setter 25 sets carriage location 53 of carriage information 27b to the "in storage", thereby, setting the corresponding carriage groups C1 to C4 as storage carriages.

Figure 8:
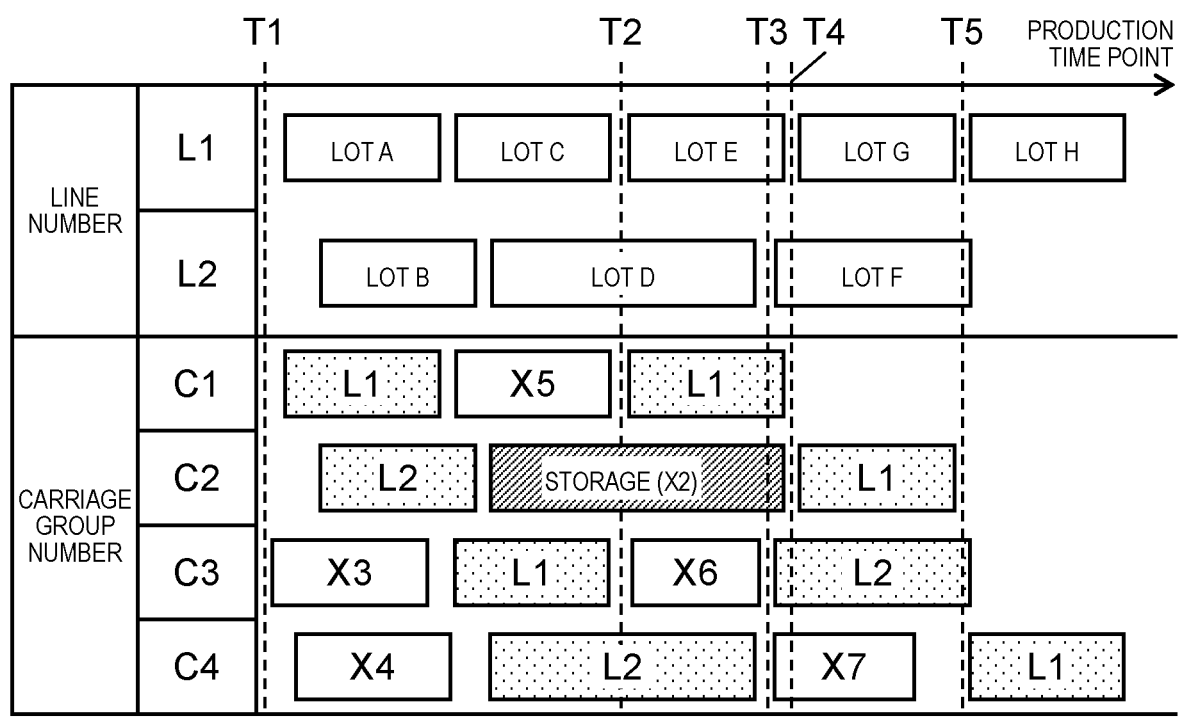
FIG. 8 is a diagram of an example of a preparation work schedule created in the managing computer (preparation schedule creating apparatus) of the exemplary embodiment of the present disclosure.

Here, an example of a storage carriage set by storage setter 25 is described with reference to FIG. 8. FIG. 8 illustrates examples of a production schedule (top) of arranging the members (tape feeder 9 and reel 17) on four carriage groups C1 to C4 and producing the mounting board in two component mounting lines L1 and L2 and a preparation work schedule (bottom) created based on the production schedule.

In the production schedule on the top, production planned lots in component mounting line L1 (line number "L1") and component mounting line L2 (line number "L2") are shown along a production time point. In component mounting line L1, lot A, lot C, lot E, lot G, and lot H are scheduled to be produced in this sequence. In component mounting line L2, lot B, lot D, lot F are scheduled to be produced in this sequence. A position of a front side (left end in the drawing) of a rectangle indicating each of the lots represents the start time point of production, and a position of a rear side (right end in the drawing) thereof represents the end time point of production.

In the preparation work schedule on the bottom, content and a work time of the arrangement work (model number 42 of the members to be arranged) of arranging the members on carriage groups C1 to C4 corresponding to carriage group number "C1" to "C4" and component mounting lines L1 and L2 to be attached are shown along the production time point. A position of a rear side (right end in the drawing) of a rectangle indicating the content and the work time of the arrangement work of carriage groups C1 to C4 represents an arrangement work end time point.

In FIG. 8, when carriage group C2 which is a usable carriage for lot B of model X2 is detached from component mounters M3 to M6 of component mounting line L2, storage setter 25 performs the storage setting process with respect to detached carriage group C2. In this example, lot G that is produced after lot B is the same model X2 as lot B, and thus storage setter 25 sets carriage group C2 as the storage carriage. Consequently, carriage group C2 is stored without removal of the members and is attached to component mounters M3 to M6 of component mounting line L1 in the production of lot G.

In FIG. 5, usable arrangement means selector 22 selects a usable carriage (usable arrangement means) which is carriage groups C1 to C4 (arrangement means) that are used in the production of one model (lot), based on production schedule information 26a and carriage information 27b (arrangement means information). Hereinafter, a model (lot) which becomes a target that selects the usable carriage is referred to as a "target lot". When usable arrangement means selector 22 selects a usable carriage of the target lot, the usable arrangement means selector selects carriage groups C1 to C4 which are the empty carriages as the usable carriage, in a case where there is an empty carriage. In addition, the usable arrangement means selector selects carriage groups C1 to C4 which are the used carriages as the usable carriage, in a case where there is no empty carriage but a used carriage.

Usable arrangement means selector 22 selects, as the usable carriage, carriage groups C1 to C4 which are used later in a sequence, of the storage carriages in a case where there is neither empty carriage nor used carriage but a storage carriage and the storage carriage is not carriage groups C1 to C4 planned to be used for the target lot. In other words, usable arrangement means selector 22 selects a usable carriage from carriage groups C1 to C4 excluding a storage carriage, in a case where it is possible to select a usable carriage (usable arrangement means) from carriage groups C1 to C4 (arrangement means) excluding the corresponding storage carriage (storage arrangement means). In addition, the usable arrangement selector selects a usable carriage from carriage groups C1 to C4 including a storage carriage, in a case where it is not possible to select a usable carriage from carriage groups C1 to C4 excluding the corresponding storage carriage.

In FIG. 5, delay determination processor 24 includes maximum number-of-worker calculator 24a and arrangement work end time point calculator 24b as internal processors. Maximum number-of-worker calculator 24a calculates the maximum number of workers (number of workers) who can perform the arrangement work of the target lot for the usable carriage (usable arrangement means), based on labor schedule information 28a (worker information). Arrangement work end time point calculator 24b calculates the arrangement work end time point when the arrangement work for the usable carriage (selected usable arrangement means) is ended by the workers of the maximum number, based on the work quantity information included in lot information 26b.

More specifically, in a case of the arrangement work on a used carriage and a storage carriage (usable arrangement means in a state in which the members are arranged), arrangement work end time point calculator 24b adds detachment work time 44 (work time of removing work of the members from the usable carriage) and attachment work time 45 (work time of arranging work of the members corresponding to one model on the usable carriage) and calculates the work time by dividing the added total time by the maximum number of workers. In addition, in a case of the arrangement work on an empty carriage (usable arrangement means in a state in which the members are not arranged), arrangement work end time point calculator 24b calculates the work time by dividing attachment work time 45 by the maximum number of workers without adding the detachment work time 44.

Delay determination processor 24 determines whether or not there is an occurrence of delay work in which the arrangement work end time point calculated by arrangement work end time point calculator 24b is later than a commenceable time point of the target lot. In other words, delay determination processor 24 determines whether or not there is an occurrence of the work delay in which the arrangement work end time point when the arrangement work for the usable carriage (selected usable arrangement means) is ended is later than the commenceable time point of the target lot (one model), based on the work quantity information included in lot information 26b and labor schedule information 28a (worker information).

In FIG. 5, preparation work schedule determiner 23 includes minimum number-of-worker calculator 23a as an internal processor. In a case where delay determination processor 24 determines that the work delay does not occur, preparation work schedule determiner 23 determines the usable carriage (usable arrangement means) selected by usable arrangement means selector 22, as the usable carriage of the target lot (one model) in the preparation work schedule. Minimum number-of-worker calculator 23a calculates the minimum number of workers who can perform the arrangement work for the usable carriage determined without the occurrence of the work delay.

preparation work schedule determiner 23 determines the number of workers, who perform the arrangement work of the target lot (one model) in the preparation work schedule, as the minimum number of workers and stores the determined usable carriage (carriage groups C1 to C4) of the target lot and the determined minimum number of workers in preparation work schedule information 27a.

Figure 9:
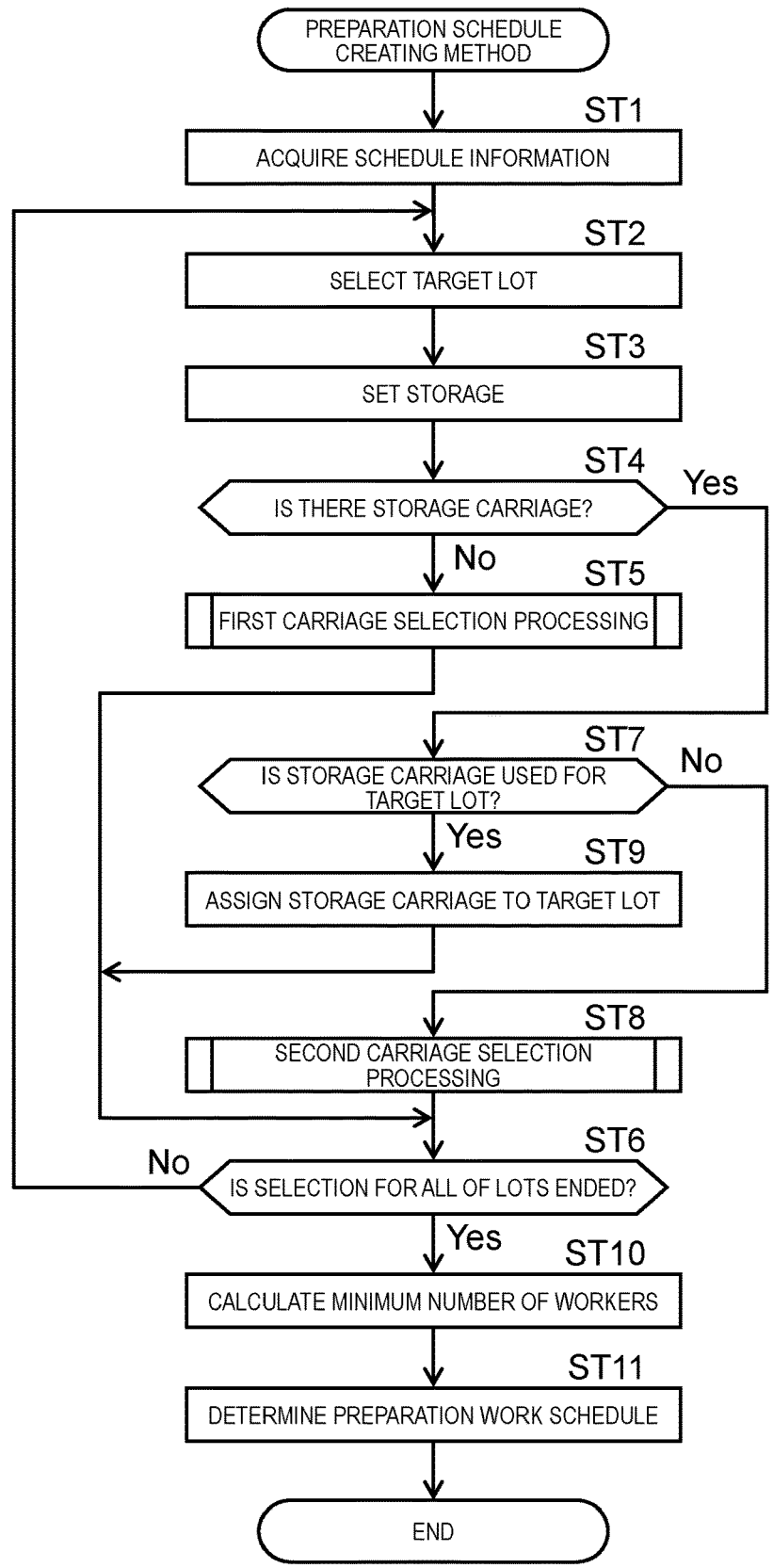
FIG. 9 is a flowchart of a preparation schedule creating method in the managing computer (preparation schedule creating apparatus) of the exemplary embodiment of the present disclosure.

Next, along flows in FIGS. 9 to 11, a preparation schedule creating method used in managing computer 3 (preparation schedule creating apparatus) that creates the preparation work schedule for arranging the members (tape feeder 9 and reel 17) corresponding to the model (lot) on the arrangement means (carriage groups C1 to C4) will be described with reference to FIGS. 7, 8, 12, 13A, and 13B. First, creating a preparation schedule corresponding to the production schedule illustrated in FIG. 8 is described. In FIG. 9, first, information acquirer 21 acquires production schedule information 26a, lot information 26b (member information or work quantity information), carriage information 27b (arrangement means information), and labor schedule information 28a (worker information) (ST1: information acquiring step).

Subsequently, usable arrangement means selector 22 selects the usable carriage (usable arrangement means) that is used in the production of the target lot (one model) (ST2: target lot selecting step). Carriage information 27b at production time point T1 in FIG. 8 becomes carriage information 27b illustrated in FIG. 7. In FIG. 7, carriage group C1, on which members for model X1 are arranged, is attached to component mounting line L1, and carriage group C2, on which members for model X2 are arranged, is attached to component mounting line L2. In this respect, usable arrangement means selector 22 selects, as the target lot, lot C that is produced as the third lot.

In FIG. 9, subsequently, storage setter 25 sets corresponding carriage groups C1 to C4 as the storage carriage (storage arrangement means) in a case where carriage groups C1 to C4 (arrangement means) detached from component mounters M3 to M6 (production equipment) can be used in the production of a model (lot) to be produced later (ST3: storage setting step). In FIG. 7, it is possible to select carriage groups C3 and C4 as the usable carriages at a time point of production time point T1. Members of model X9 are arranged on carriage group C4 in preparation area As. However, model X9 is not used for lots A to H which are produced after production time point T1, and thus carriage group C4 is not set as the storage carriage.

In FIG. 9, subsequently, usable arrangement means selector 22 determines whether or not usable carriage groups C3 and C4 include the storage carriage (ST4: storage carriage presence/absence determining step). Usable carriage groups C3 and C4 do not include the storage carriage at the time point of production time point T1 (No in ST4), and thus usable arrangement means selector 22 selects a usable carriage from usable carriage groups C3 and C4 (ST5: first carriage selection processing step).

Figure 10:
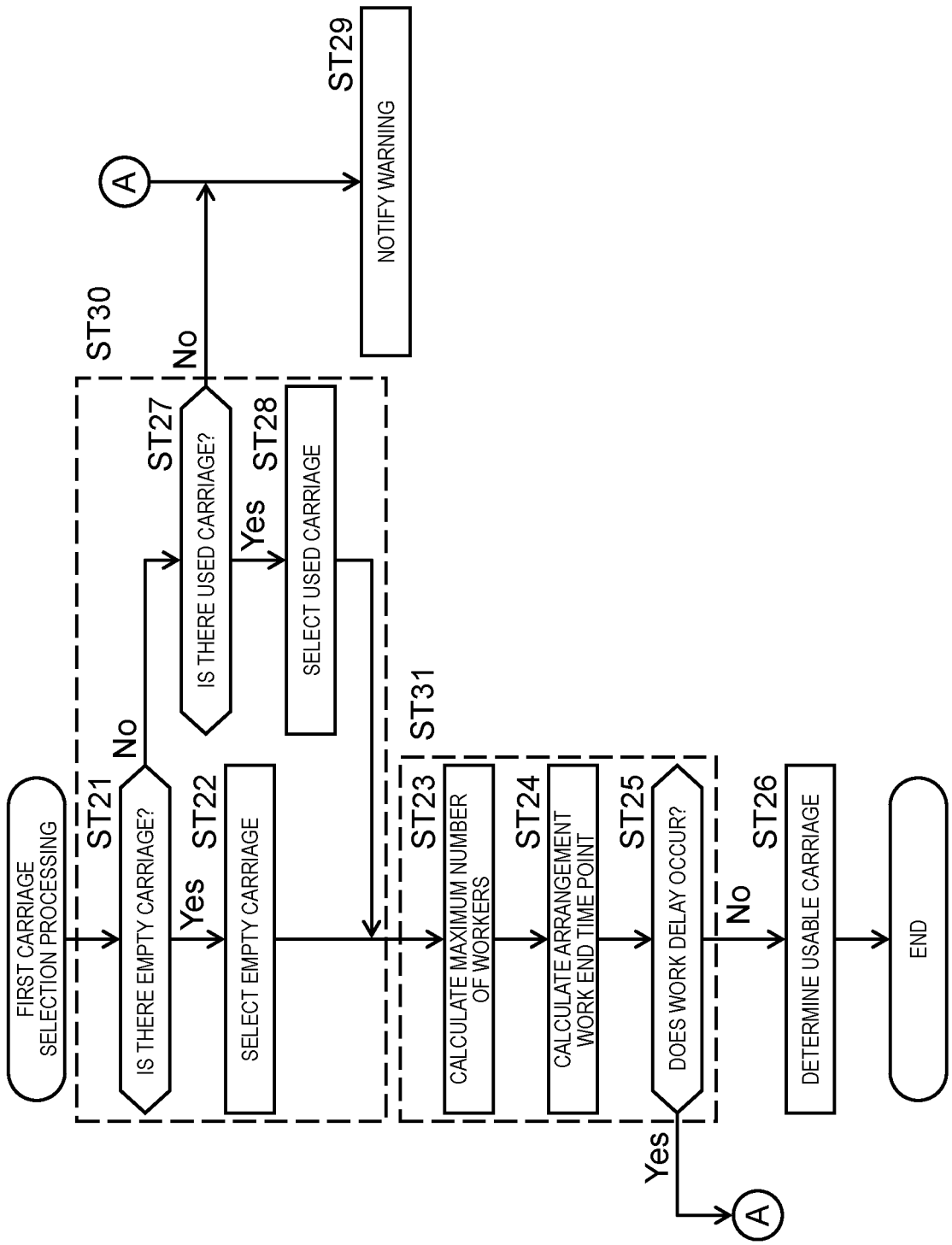
FIG. 10 is a flowchart of first carriage selection processing in the managing computer (preparation schedule creating apparatus) of the exemplary embodiment of the present disclosure.

In FIG. 10, in the first carriage selection processing step (ST5), first, usable arrangement means selector 22 determines whether or not usable carriage groups C3 and C4 include an empty carriage (ST21: empty carriage presence/absence determining step). Carriage group C3 is an empty carriage at the time point of production time point T1. The empty carriage is included in usable carriage groups C3 and C4 (Yes in ST21), and thus usable arrangement means selector 22 selects the empty carriage (carriage group C3) as the usable carriage (ST22: empty carriage selecting step).

Subsequently, maximum number-of-worker calculator 24a calculates the maximum number of workers who can perform the arrangement work for the selected usable carriage at the time point, based on labor schedule information 28a (worker information) (ST23: maximum number-of-worker calculating step). Subsequently, arrangement work end time point calculator 24b calculates the arrangement work end time point by the workers of the maximum number, based on the work quantity information included in lot information 26b (ST24: arrangement work end time point calculating step). The selected usable carriage is the empty carriage, and thus arrangement work end time point calculator 24b calculates the arrangement work end time point based on the work time obtained by dividing attachment work time 45 by the maximum number of workers without adding the detachment work time 44.

Subsequently, delay determination processor 24 determines whether or not there is an occurrence of work delay in which the arrangement work end time point is later than the commenceable time point of the target lot (ST25: work delay determining step). As described above, the maximum number-of-worker calculating step (ST23), the arrangement work end time point calculating step (ST24), and the work delay determining step (ST25) are included in a delay determination processing step (ST31) of determining whether or not there is an occurrence of the work delay in which the arrangement work end time point when the arrangement work for the selected usable carriage (usable arrangement means) is ended is later than the commenceable time point of the target lot (one model), based on the work quantity information and the worker information.

In FIG. 8, the arrangement work end time point of the target lot (lot C) is earlier than the commenceable time point, and thus the work delay does not occur. Therefore, in FIG. 10, it is determined that the work delay does not occur in the work delay determining step (ST25) (No), usable arrangement means selector 22 determines selected carriage group C3 as the usable carriage (ST26: usable carriage determining step), and first carriage selection processing (ST5) is ended.

In FIG. 9, usable arrangement means selector 22 determines whether or not selection of the usable carriages for all of production planned lots A to H is ended (ST6; selection end determining step). Here, the selection of the usable carriages for all of lots A to H is not ended (No in ST6), and thus the process returns to the target lot selecting step (ST2) such that the next lot is selected. In other words, lot D is selected as the target lot.

Subsequently, the storage setting step (ST3) is performed; however, usable carriage group C4 is not set as the storage carriage. Hence, it is determined that usable carriage group C4 does not include the storage carriage in the storage carriage presence/absence determining step (ST4) (No), and the first carriage selection processing step (ST5) is performed. In FIG. 10, carriage group C4 is the used carriage on which the members for model X9 are arranged, and thus it is determined that the usable carriage group C4 does not include an empty carriage in the empty carriage presence/absence determining step (ST21) (No). Subsequently, usable arrangement means selector 22 determines whether or not usable carriage group C4 includes the used carriage (ST27; used carriage presence/absence determining step).

In FIG. 10, usable carriage group C4 includes the used carriage (Yes in ST27), and thus usable arrangement means selector 22 selects the used carriage (carriage group C4) as the usable carriage (ST28; used carriage selecting step). Subsequently, the delay determination processing step (ST31) is performed. The selected usable carriage is the used carriage (carriage group C4), and thus arrangement work end time point calculator 24b calculates the arrangement work end time point based on the work time obtained by adding detachment work time 44 and attachment work time 45 and dividing the added total time by the maximum number of workers in the arrangement work end time point calculating step (ST24).

In FIG. 8, the arrangement work end time point of the target lot (lot D) is earlier than the commenceable time point, and thus the work delay does not occur. Therefore, in FIG. 10, it is determined that the work delay does not occur in the work delay determining step (ST25) (No), usable arrangement means selector 22 determines selected carriage group C4 as the usable carriage (ST26: usable carriage determining step), and the first carriage selection processing (ST5) is ended. Subsequently, the selection end determining step (ST6) is performed. Here, the selection of the usable carriages for all of lots A to H is not ended (No in ST6), and thus the process returns to the target lot selecting step (ST2) such that lot E is selected as the next target lot.

In FIG. 10, the empty carriage presence/absence determining step (ST21), the empty carriage selecting step (ST22), the used carriage presence/absence determining step (ST27), and the used carriage selecting step (ST28) are included in a usable carriage candidate selecting step (ST30) of selecting a candidate of the usable carriage from usable carriage groups C1 to C4. In the usable carriage candidate selecting step (ST30), the empty carriage is preferentially selected as the candidate of the usable carriage, in a case where usable carriage groups C1 to C4 include both the empty carriage and the used carriage.

In FIG. 10, in the first carriage selection processing step (ST5), in a case where usable carriage groups C1 to C4 include neither the empty carriage nor the used carriage (No in ST21, and No in ST27), or in a case where usable carriage groups C1 to C4 include either the empty carriage or the used carriage (Yes in ST21, or Yes in ST27) but the work delay occurs (Yes in ST25) when the empty carriage or the used carriage is selected as the usable carriage, usable arrangement means selector 22 notifies display 30 of managing computer 3 a warning that it is not possible to select the usable carriage (ST29: warning notifying step).

In FIG. 8, carriage groups C1 to C4 which can be used before the start time point (production time point T2) of the production of the target lot (lot E) are carriage group C1 (used carriage) on which the members for model X1 used for the production of lot A are arranged and carriage group C2 (used carriage) on which the members for model X2 used for the production of lot B are arranged. However, model X1 is not used for lots E to H which are produced after production time point T2, and thus carriage group C1 is not set as the storage carriage in the storage setting step (ST3). On the other hand, model X2 is produced as lot G, carriage group C2 is set as the storage carriage in the storage setting step (ST3).

In FIG. 9, usable carriage groups C1 and C2 include the storage carriage (carriage group C2), and thus it is determined that the storage carriage is present (Yes in ST4). Hence, usable arrangement means selector 22 determines whether or not the storage carriage (carriage group C2) is carriage group C2 used for the production of the target lot (lot E) (ST7: storage carriage determining step). The storage carriage (carriage group C2) is not used for the production of the target lot (lot E) (No in ST7), and thus usable arrangement means selector 22 selects a usable carriage from usable carriage groups C1 and C2 (ST8: second carriage selection processing step).

Figure 11:
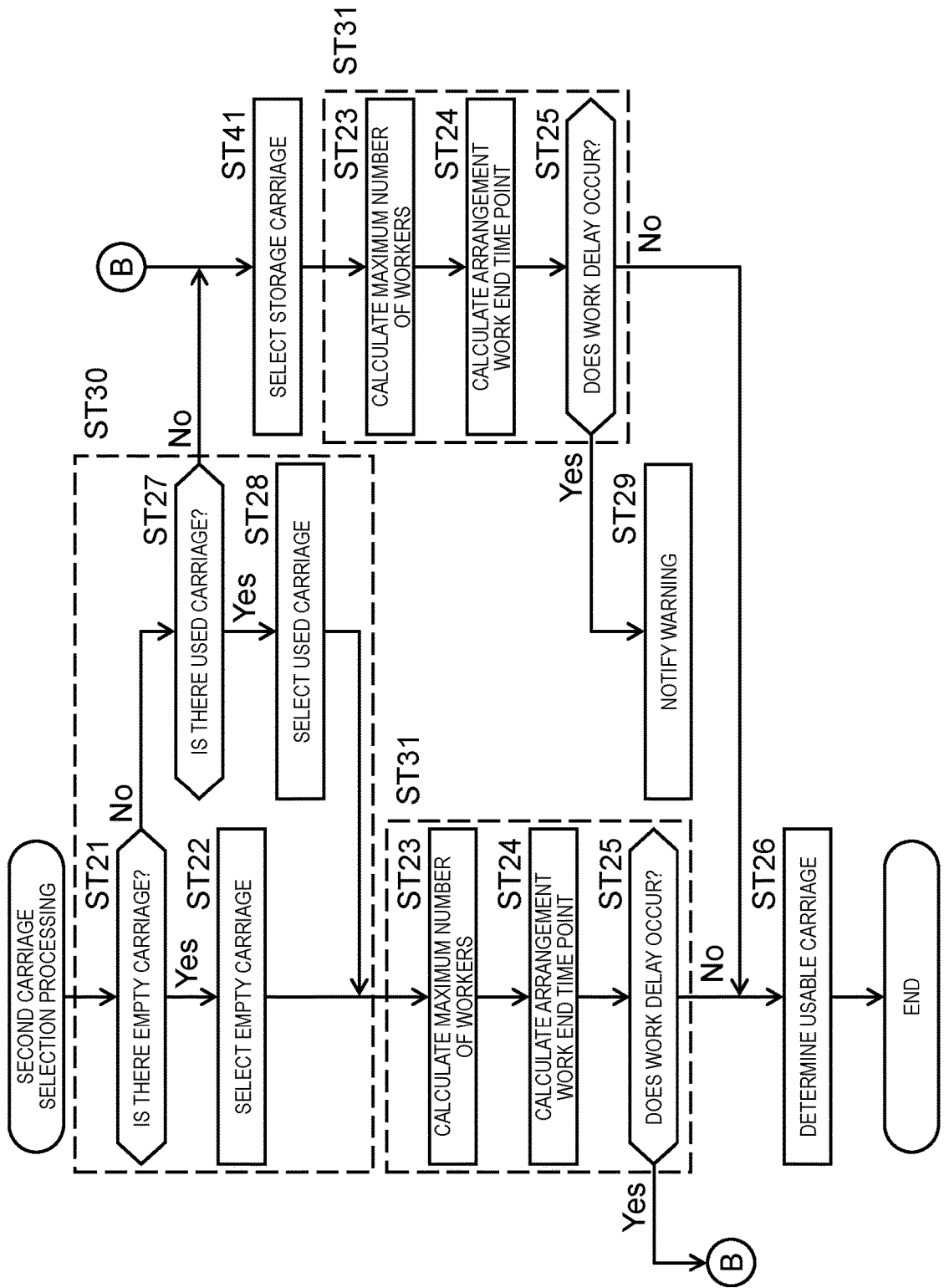
FIG. 11 is a flowchart of second carriage selection processing in the managing computer (preparation schedule creating apparatus) of the exemplary embodiment of the present disclosure.

In FIG. 11, in the second carriage selection processing step (ST8), first, similarly to the first carriage selection processing step (ST5), the usable carriage candidate selecting step (ST30) is performed. In the usable carriage candidate selecting step (ST30), usable carriage groups C1 and C2 include the used carriage (carriage group C1) (Yes in ST27), and thus carriage group C1 is selected as the candidate of the usable carriage (ST28). Subsequently, similarly to the first carriage selection processing step (ST5), the delay determination processing step (ST31) is performed.

In FIG. 8, the arrangement work end time point of the target lot (lot E) is earlier than the commenceable time point, and thus the work delay does not occur. Therefore, in FIG. 11, it is determined that the work delay does not occur in the delay determination processing step (ST31) (No), carriage group C1 selected in the usable carriage determining step (ST26) is determined as the usable carriage, and second carriage selection processing (ST8) is ended. FIG. 12 illustrates carriage information 27b obtained at the time point when carriage group C1 is determined as the usable carriage for lot E.

Subsequently, the selection of the usable carriages for all of lots A to H is not ended (No in ST6), and thus the process returns to the target lot selecting step (ST2) such that lot F is selected as the next target lot. In FIG. 8, carriage groups C1 to C4 which can be used before the start time point (production time point T3) of the production of lot F are carriage group C3 (used carriage) on which the members for model X3 used for the production of lot C are arranged and carriage group C2 (storage carriage) on which the members for model X2 are arranged. Hereinafter, the same steps as those for lot E are performed, and a usable carriage for lot F is determined as carriage group C3.

Subsequently, the selection of the usable carriages for all of lots A to H is not ended (No in ST6), and thus the process returns to the target lot selecting step (ST2) such that lot G is selected as the next target lot. In FIG. 8, carriage groups C1 to C4 which can be used before the start time point (production time point T4) of the production of lot G are carriage group C2 (storage carriage) on which the members for model X2 are arranged and carriage group C4 (used carriage) on which the members for model X4 used for the production of lot D are arranged.

In FIG. 9, usable carriage groups C2 and C4 include the storage carriage (carriage group C2), and thus it is determined that the storage carriage is present in the storage carriage presence/absence determining step (ST4) (Yes in ST4). Hence, the storage carriage determining step (ST7) is performed. The storage carriage (carriage group C2) is used for the production of the target lot (lot G) (Yes in ST7), and thus usable arrangement means selector 22 assigns the storage carriage (carriage group C2) to a usable carriage for the target lot (lot G) (ST9: storage carriage assigning step).

Subsequently, the selection end determining step (ST6) is performed. Here, the selection of the usable carriages for all of lots A to H is not ended (No in ST6), and thus the process returns to the target lot selecting step (ST2) such that lot H is selected as the next target lot. In FIG. 8, carriage groups C1 to C4 which can be used before the start time point (production time point T5) of the production of lot H are carriage group C4 (used carriage) on which the members for model X4 used for the production of lot D are arranged and carriage group C1 (used carriage) on which the members for model X5 used for the production of lot E are arranged. Hereinafter, the same steps as those for lot D are performed, and a usable carriage for lot H is determined as carriage group C4 (used carriage) that has been used for lot D, the carriage group being used at a commence able time point of the previous arrangement work.

In FIG. 9, subsequently, the selection end determining step (ST6) is performed. Here, the selection of the usable carriages for all of lots A to H is ended (Yes in ST6), and then minimum number-of-worker calculator 23a calculates the minimum number of workers who can perform the arrangement work for the usable arrangement means without the occurrence of the work delay, with respect to all of lots A to H (ST10: minimum number-of-worker calculating step).

Subsequently, preparation work schedule determiner 23 determines the selected usable carriage as the usable carriage for the target lot (one model) in the preparation work schedule (ST11: schedule determining step). The determined preparation work schedule is stored as preparation work schedule information 27a. Consequently, it is possible to create the preparation work schedule in which the number of workers who perform the arrangement work is optimized to the minimum number of workers to the extent that the production schedule is not influenced by the number of workers.

As described above, the minimum number-of-worker calculating step (ST10) and the schedule determining step (ST11) are included in a preparation work schedule determining step of determining the preparation work schedule in which the number of workers who perform the arrangement work of the target lot (one model) is set to the minimum number of workers. In addition, the storage carriage presence/absence determining step (ST4), the first carriage selection processing (ST5), the storage carriage determining step (ST7), the second carriage selection processing (ST8), and the storage carriage assigning step (ST9) are included in a useable arrangement means selecting step of selecting a usable carriage (usable arrangement means) that is used for the production of the target lot (one model) based on production schedule information 26a and carriage information 27b (arrangement means information).

Next, an example of the work delay that occurs in the creating of the preparation schedule will be described with reference to the production schedule illustrated in FIG. 13A. In the production schedule illustrated in FIG. 13A, lot A, lot C, lot E, and lot G are scheduled to be produced in this sequence in component mounting line L1. Lot B, lot D, lot F, and lot H are scheduled to be produced in this sequence in component mounting line L2. The production schedule is different from the production schedule illustrated in FIG. 8 in that a production time of lot D is short and lot H is produced in component mounting line L2. Steps of determining the usable carriages for lots A to E are the same as those in FIG. 8, and thus the description thereof is omitted. Hereinafter, steps after a time point when lot F is selected as the target lot in the target lot selecting step (ST2) will be described.

Figure 13A:
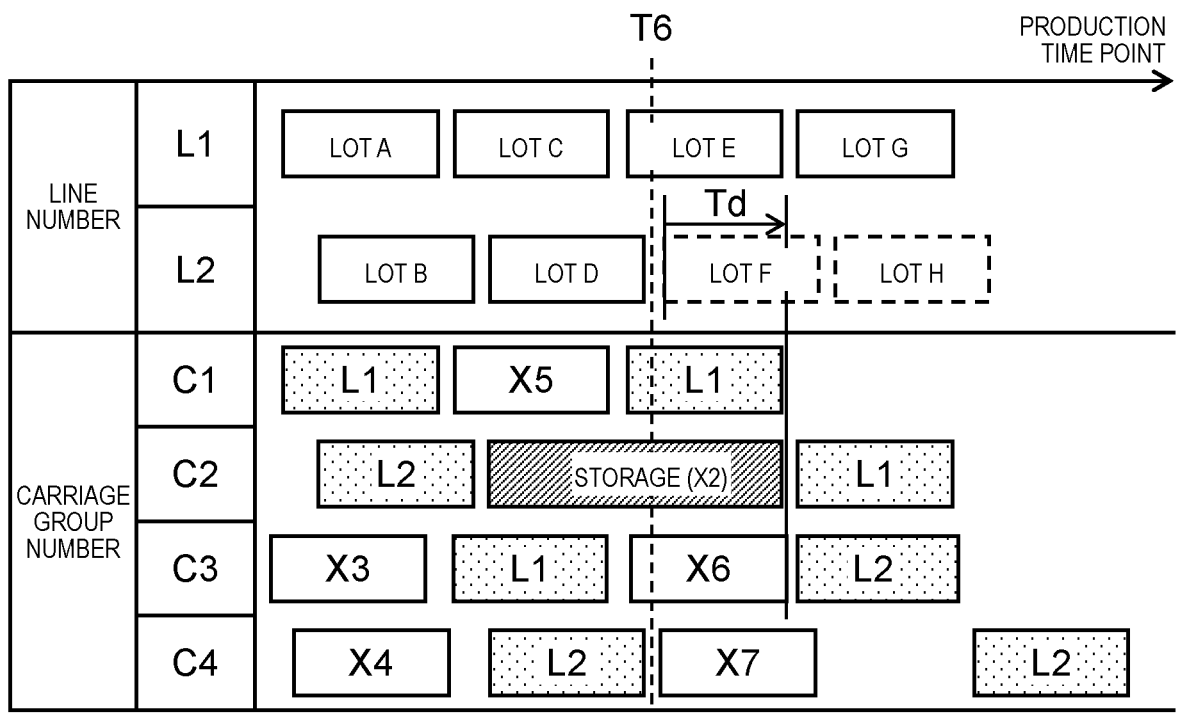
FIG. 13A is a diagram of an example of a preparation work schedule in which a work delay occurs, the preparation work schedule being created in the managing computer (preparation schedule creating apparatus) of the exemplary embodiment of the present disclosure.

In FIG. 13A, carriage information 27b obtained at the time point when the usable carriage for lot E is determined is the same as carriage information 27b illustrated in FIG. 12. In other words, carriage groups C1 to C4 which can be used before the start time point (production time point T6) of the production of lot F are carriage group C3 (used carriage) on which the members for model X3 used for the production of lot C are arranged and carriage group C2 (storage carriage) on which the members for model X2 are arranged.

In FIG. 9, carriage group C3 is not set as the storage carriage in the storage setting step (ST3). However, usable carriage groups C2 and C3 include the storage carriage (carriage group C2), and thus it is determined that the storage carriage is present in the storage carriage presence/absence determining step (ST4) (Yes in ST4). Hence, the storage carriage determining step (ST7) is performed. The storage carriage (carriage group C2) is not used for the production of the target lot (lot F) (No in ST7), and thus the second carriage selection processing step (ST8) is performed.

In FIG. 11, in the second carriage selection processing step (ST8), first, the usable carriage candidate selecting step (ST30) is performed, and carriage group C3 which is the used carriage is selected as a candidate of the usable carriage. Subsequently, the delay determination processing step (ST31) is performed. In FIG. 13A, the arrangement work end time point of the target lot (lot F) is later than the commenceable time point, and thus work delay Td occurs. Therefore, in FIG. 11, it is determined that work delay Td occurs in the delay determination processing step (ST31) (Yes), usable arrangement means selector 22 selects the storage carriage (carriage group C2) as the usable carriage (ST41: storage carriage selecting step). In a case where there are a plurality of storage carriages, usable arrangement means selector 22 selects a storage carriage of which the start time point of production is latest as the usable carriage.

Subsequently, the delay determination processing step (ST31) is performed. The selected usable carriage is the storage carriage (carriage group C2), and thus arrangement work end time point calculator 24b calculates the arrangement work end time point based on the work time obtained by adding detachment work time 44 and attachment work time 45 and dividing the added total time by the maximum number of workers in the arrangement work end time point calculating step (ST24).

Figure 13B:
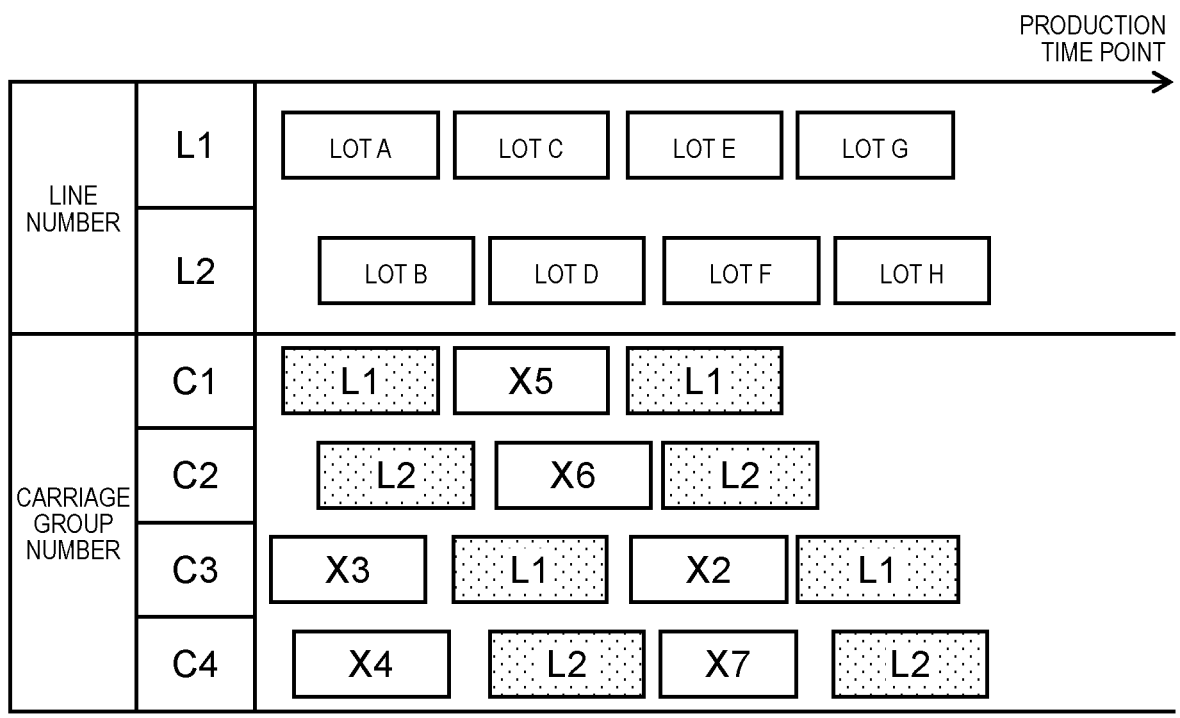
FIG. 13B is a diagram of an example of a preparation work schedule in which the work delay is eliminated, the preparation work schedule being created in the managing computer (preparation schedule creating apparatus) of the exemplary embodiment of the present disclosure.

FIG. 13B illustrates an example in which carriage C2 is selected as the usable carriage of lot F, and the arrangement work end time point is calculated. Here, work delay Td does not occur. Therefore, in FIG. 11, it is determined that work delay Td does not occur in the work delay determining step (ST25) (No), usable arrangement means selector 22 determines selected carriage group C2 as the usable carriage (ST26: usable carriage determining step), and the second carriage selection processing (ST8) is ended.

In the usable carriage candidate selecting step (ST30), even in a case where usable carriage groups C1 to C4 include neither the empty carriage nor the used carriage (No in ST21, and No in ST27), the storage carriage selecting step (ST41) is performed. In addition, in a case where the storage carriage is selected as the usable carriage and work delay Td occurs (Yes in ST25), the warning notifying step (ST29) is performed.

As described above, in the second carriage selection processing step (ST8), in a case where usable carriage groups C1 to C4 include neither the empty carriage nor the used carriage (No in ST21, and No in ST27), or in a case where usable carriage groups C1 to C4 include either the empty carriage or the used carriage (Yes in ST21, or Yes in ST27) but the work delay occurs (Yes in ST25) when the empty carriage or the used carriage is selected as the usable carriage, the storage carriage selecting step (ST41) is performed such that the storage carriage is selected as the usable carriage. In a case where the storage carriage is selected as the usable carriage and work delay Td occurs (Yes in ST25), the warning notifying step (ST29) is performed.

As described above, the preparation schedule creating method used in managing computer 3 (preparation schedule creating apparatus) includes the information acquiring step (ST1) of acquiring production schedule information 26a, lot information 26b (member information or work quantity information), carriage information 27b (arrangement means information), and labor schedule information 28a (worker information). Further, the preparation schedule creating method includes the useable arrangement means selecting step (ST4, ST5, ST7 to ST9) of selecting the usable carriage (usable arrangement means) that is used for the production of the target lot (one model) based on production schedule information 26a and carriage information 27b (arrangement means information) and the preparation work schedule determining step (ST10 and ST11) of determining the selected usable carriage as the usable carriage for the target lot in the preparation work schedule.

In addition, managing computer 3 of the exemplary embodiment is the preparation schedule creating apparatus that creates the preparation work schedule for arranging the members corresponding to the model (lot) on the arrangement means (carriage 5 or carriage groups C1 to C4) that is attached to the production equipment (component mounters M3 to M6) so as to arrange the members (tape feeder 9 and reel 17) used for the production of the product (mounting board). Managing computer 3 includes Information acquirer 21 that acquires production schedule information 26a, lot information 26b (member information or work quantity information), carriage information 27b (arrangement means information), and labor schedule information 28a (worker information). Further, managing computer 3 includes useable arrangement means selector 22 that selects the usable carriage (usable arrangement means) that is used for the production of the target lot (one model) based on production schedule information 26a and carriage information 27b (arrangement means information) and preparation work schedule determiner 23 that determines the selected usable carriage as the usable carriage for the target lot in the preparation work schedule.

Consequently, it is possible to create the optimal schedule for arranging the members (tape feeder 9 and reel 17) on the arrangement means (carriage 5 or carriage groups C1 to C4).

As described above, the description is provided based on the exemplary embodiments of the present disclosure. Various modification examples can be made from the embodiments by combining the types of products which are produced in the production lines, and thus those skilled in the art understand that the modification examples are also included within the scope of the present disclosure. For example, the production line may be a home appliance production line through which home appliances as products are assembled or may be a food processing line through which a food processing product as a product is manufactured.

In the present disclosure, the preparation schedule creating method and the preparation schedule creating apparatus achieve an effect in that it is possible to create the optimal schedule for arranging the members on the arrangement means and are used in a field of mounting an electronic component on a board.

What is claimed is:

1. A preparation schedule creating method used in a preparation schedule creating apparatus comprising at least one processor that creates a preparation work schedule for arranging tape feeders corresponding to a plurality of models on at least one carriage, the at least one carriage being attached to production equipment that produces the plurality of models of products, so as to arrange the tape feeders that are used for production of the products, the method comprising:
   an information acquiring step of acquiring production schedule information including a production sequence for producing the plurality of models of products, a commenceable time point when production of the plurality of models of products is commenceable, and a production deadline time point, tape feeder information related to the tape feeders, carriage information related to a state of the at least one carriage attached to the production equipment and a state of equipment detached carriage detached from the production equipment, and work quantity information related to a work quantity of arrangement work of arranging tape feeders on the at least one carriage;
   a storage setting step of setting the equipment detached carriage as a storage carriage in a case where the equipment detached carriage is usable in production of a model to be produced later;
   a usable carriage selecting step of selecting a usable carriage which is the carriage that is used in production of one model, based on the production schedule information and the carriage information, wherein:
      the usable carriage is selected from a plurality of carriages excluding the storage carriage, in a case where the usable carriage is selectable from the plurality of carriages excluding the storage carriage, and the usable carriage is selected from the plurality of carriages including the storage carriage, in a case where the usable carriage is not selectable from the plurality of carriages excluding the storage carriage; and
   a preparation work schedule determining step of determining the selected usable carriage as the usable carriage for the one model in the preparation work schedule.

2. The preparation schedule creating method of claim 1, further comprising:
   a delay determination processing step of determining whether or not there is an occurrence of a work delay in which an arrangement work end time point when the arrangement work for the selected usable carriage is ended is later than the commenceable time point of the one model, based on the work quantity information and the worker information, wherein, in a case where the work delay does not occur, the preparation work schedule determining step is performed.

3. The preparation schedule creating method of claim 2, wherein the delay determination processing step includes
a maximum number-of-worker calculating step of calculating the maximum number of workers who can perform the arrangement work for the usable carriage, based on a worker information related to a number of workers that performs the arrangement work, and
an arrangement work end time point calculating step of calculating the arrangement work end time point by the workers of the maximum number, based on the work quantity information.

4. The preparation schedule creating method of claim 2, wherein the preparation work schedule determining step includes
a minimum number-of-worker calculating step of calculating the minimum number of workers who can perform the arrangement work for the usable carriage without the occurrence of the work delay, and
wherein, in the preparation work schedule determining step, the number of workers, who perform the arrangement work of the one model in the preparation work schedule, is determined as the minimum number of workers.

5. The preparation schedule creating method of claim
wherein arrangement work for the usable carriage in a state in which the tape feeders are arranged includes work of removing the tape feeders from the usable carriage and work of arranging tape feeders corresponding to the one model on the usable carriage, and
wherein arrangement work for the usable carriage in a state in which the tape feeders are not arranged does not include work of removing the tape feeders from the usable carriage but includes work of arranging the tape feeders corresponding to the one model on the usable carriage.

6. The preparation schedule creating method of claim 1, wherein the products are mounting boards on which an electronic component is mounted, and
wherein the production equipment is a component mounter.

7. A non-transitory computer-readable medium having instructions stored thereon that, when executed, cause a processor to perform the preparation schedule creating method of claim 1.

8. A preparation schedule creating apparatus comprising at least one processor that creates a preparation work schedule for arranging tape feeders corresponding to a plurality of models on at least one carriage, the at least one carriage being attached to production equipment that produces the plurality of models of products, so as to arrange the tape feeders that are used for production of the products, the apparatus comprising:
an information acquirer that acquires production schedule information including a production sequence for producing the plurality of models of products, a commenceable time point when production of the plurality of models of products is commenceable, and a production deadline time point, tape feeder information related to the tape feeders, carriage information related to a state of the at least one carriage attached to the production equipment and a state of equipment detached carriage detached from the production equipment, and work quantity information related to a work quantity of arrangement work of arranging tape feeders on the at least one carriage;
a storage setter that sets the equipment detached carriage as a storage carriage in a case where the equipment detached carriage is usable in production of a model to be produced later;
a usable carriage selector that selects a usable carriage which is the carriage that is used in production of one model, based on the production schedule information and the carriage information, wherein:
the usable carriage is selected from a plurality of carriages excluding the storage carriage, in a case where the usable carriage is selectable from the plurality of carriages excluding the storage carriage, and the usable carriage is selected from the plurality of carriages including the storage carriage, in a case where the usable carriage is not selectable from the plurality of carriages excluding the storage carriage; and
a preparation work schedule determiner that determines the selected usable carriage as the usable carriage for the one model in the preparation work schedule.

9. The preparation schedule creating apparatus of claim 8, further comprising:
a delay determination processor that determines whether or not there is an occurrence of a work delay in which an arrangement work end time point when the arrangement work for the selected usable carriage is ended is later than the commenceable time point of the one model, based on the work quantity information and the worker information,
wherein, in a case where the work delay does not occur, the preparation work schedule determiner determines the selected usable carriage as the usable carriage for the one model in the preparation work schedule.

10. The preparation schedule creating apparatus of claim 9,
wherein the delay determination processor includes
a maximum number-of-worker calculator that calculates the maximum number of workers who can perform the arrangement work for the usable carriage, based on a worker information related to a number of workers that performs the arrangement work, and
an arrangement work end time point calculator that calculates the arrangement work end time point by the workers of the maximum number, based on the work quantity information.

11. The preparation schedule creating apparatus of claim 9,
wherein the preparation work schedule determiner includes
a minimum number-of-worker calculator that calculates the minimum number of workers who can perform the arrangement work for the usable carriage without the occurrence of the work delay, and
wherein the preparation work schedule determiner determines the number of workers, who perform the arrangement work of the one model in the preparation work schedule, as the minimum number of workers.

12. The preparation schedule creating apparatus of claim 8,
wherein arrangement work for the usable carriage in a state in which the tape feeders are arranged includes work of removing the tape feeders from the usable carriage and work of arranging tape feeders corresponding to the one model on the usable carriage, and wherein arrangement work for the usable carriage in a state in which the tape feeders are not arranged does not include work of removing the tape feeders from the usable carriage but includes work of arranging the tape feeders corresponding to the one model on the usable carriage.

13. The preparation schedule creating apparatus of claim 8, wherein the products are mounting boards on which an electronic component is mounted, and wherein the production equipment is a component mounter.

14. A preparation schedule creating apparatus comprising at least one processor that creates a preparation work schedule for arranging tape feeders corresponding to a plurality of models on at least one carriage, the at least one carriage being attached to production equipment that produces the plurality of models of products, so as to arrange the tape feeders that are used for production of the products, the apparatus comprising:

an information acquirer that acquires production schedule information including a production sequence for producing the plurality of models of products, a commenceable time point when production of the plurality of models of products is commenceable, and a production deadline time point, tape feeder information related to the tape feeders, carriage information related to a state of the at least one carriage attached to the production equipment and a state of equipment detached carriage detached from the production equipment, and work quantity information related to a work quantity of arrangement work of arranging tape feeders on the at least one carriage;

a storage setter that sets the equipment detached carriage as a storage carriage in a case where the equipment detached carriage is usable in production of a model to be produced later;

a usable carriage selector that selects a usable carriage which is the carriage that is used in production of one model, based on the production schedule information and the carriage information, wherein:

when there is a storage carriage for production of the one model, the storage carriage is selected as the usable carriage;

when there is no storage carriage, an empty carriage is selected as the usable carriage; and when there is neither a storage carriage nor an empty carriage, a used carriage that is not empty is selected as the usable carriage; and a preparation work schedule determiner that determines the selected usable carriage as the usable carriage for the one model in the preparation work schedule.

15. The preparation schedule creating apparatus of claim 14, further comprising:

a delay determination processor that determines whether or not there is an occurrence of a work delay in which an arrangement work end time point when the arrangement work for the selected usable carriage is ended is later than the commenceable time point of the one model, based on the work quantity information and the worker information, wherein, in a case where the work delay does not occur, the preparation work schedule determiner determines the selected usable carriage as the usable carriage for the one model in the preparation work schedule.

16. A preparation schedule creating method used in a preparation schedule creating apparatus comprising at least one processor that creates a preparation work schedule for arranging tape feeders corresponding to a plurality of models on at least one carriage, the at least one carriage being attached to production equipment that produces the plurality of models of products, so as to arrange the tape feeders that are used for production of the products, the method comprising:

an information acquiring step of acquiring production schedule information including a production sequence for producing the plurality of models of products, a commenceable time point when production of the plurality of models of products is commenceable, and a production deadline time point, tape feeder information related to the tape feeders, carriage information related to a state of the at least one carriage attached to the production equipment and a state of equipment detached carriage detached from the production equipment, and work quantity information related to a work quantity of arrangement work of arranging tape feeders on the at least one carriage;

a storage setting step of setting the equipment detached carriage as a storage carriage in a case where the equipment detached carriage is usable in production of a model to be produced later;

a usable carriage selecting step of selecting a usable carriage which is the carriage that is used in production of one model, based on the production schedule information and the carriage information, wherein:

when there is a storage carriage for production of the one model and when the storage carriage is used for a target lot, the storage carriage is selected as the usable carriage;

when there is no storage carriage or when there is a storage carriage and the storage carriage is not used for the target lot, an empty carriage is selected as the usable carriage; and when there is neither a storage carriage nor an empty carriage, a used carriage that is not empty is selected as the usable carriage; and a preparation work schedule determining step of determining the selected usable carriage as the usable carriage for the one model in the preparation work schedule.

* * * * *